(12) United States Patent
Minami

(10) Patent No.: US 9,447,899 B2
(45) Date of Patent: Sep. 20, 2016

(54) TUBE SUPPORT STRUCTURE FOR AIRCRAFT

(75) Inventor: Keisuke Minami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 337 days.

(21) Appl. No.: 13/877,952

(22) PCT Filed: Oct. 21, 2011

(86) PCT No.: PCT/JP2011/074342
§ 371 (c)(1),
(2), (4) Date: Apr. 5, 2013

(87) PCT Pub. No.: WO2012/057039
PCT Pub. Date: May 3, 2012

(65) Prior Publication Data
US 2013/0187013 A1   Jul. 25, 2013

(30) Foreign Application Priority Data
Oct. 26, 2010   (JP) ................................. 2010-239961

(51) Int. Cl.
*F16L 3/08* (2006.01)
*F16L 3/12* (2006.01)
(Continued)

(52) U.S. Cl.
CPC .......... *F16L 3/1222* (2013.01); *B64D 37/005* (2013.01); *F16L 3/1091* (2013.01);
(Continued)

(58) Field of Classification Search
CPC ....... F16L 3/10; F16L 3/1008; F16L 3/1016; F16L 3/04; F16L 3/1091; F16L 3/08; F16L 3/02; F16L 3/06; F16L 3/00; H02G 3/32; H02G 3/30; H02G 3/22; H02G 3/34; H02G 11/00; B60R 16/0207; B60R 16/0222
USPC ........... 248/65, 70, 133, 139, 140, 142, 143, 248/371, 398, 49, 55
See application file for complete search history.

(56) References Cited

U.S. PATENT DOCUMENTS 2,922,609 A * 1/1960 Collier ....................... 248/179.1
3,516,630 A * 6/1970 Janssens ....................... 248/55
(Continued)

FOREIGN PATENT DOCUMENTS

CN   201011399   1/2008
CN   101235929   8/2008
(Continued)

OTHER PUBLICATIONS

Japanese Office Action issued Aug. 29, 2014 in corresponding Japanese Patent Application No. 2010-239961 with partial English translation.
(Continued)

*Primary Examiner* — Syed A Islam
*Assistant Examiner* — Taylor Morris
(74) *Attorney, Agent, or Firm* — Wenderoth, Lind & Ponack, L.L.P.

(57) ABSTRACT

A tube support structure for an aircraft includes: a parallel movement mechanism configured to support the tube movably in parallel; and an angle adjustment mechanism configured to support the tube angle-adjustably. The parallel movement mechanism includes: an eccentric sleeve, through which the tube passes, configured to adjust a position of the tube in a Z direction perpendicular to the X direction, and a Y direction adjustment mechanism configured to adjust a position of the eccentric sleeve in a Y direction perpendicular to the X direction and the Z direction. The angle adjustment mechanism includes: a first member configured to have a first curved surface and support the tube, and a second member configured to have a second curved surface with a shape corresponding to the first curved surface, have contact slidably with the first curved surface at the second curved surface, and support the first member by the second curved surface. Each of the first curved surface and the second curved surface is formed such that a cross-sectional shape in an XZ plane is a circular arc shape, and an angle of the tube is adjusted by sliding the first curved surface with respect to the second curved surface. Thus, a tube support structure for aircraft, which can suppress a preload, is provided.

6 Claims, 19 Drawing Sheets

(51) Int. Cl.
*B64D 37/00* (2006.01)
*F16L 3/16* (2006.01)
*F16L 5/10* (2006.01)
*F16L 3/22* (2006.01)
*F16L 3/00* (2006.01)
*A47F 5/12* (2006.01)
*A47G 29/00* (2006.01)
*F16L 3/10* (2006.01)
*F16M 11/10* (2006.01)

(52) U.S. Cl.
CPC ..... *F16L 3/16* (2013.01); *F16L 5/10* (2013.01); *F16L 3/10* (2013.01); *F16L 3/1008* (2013.01); *F16L 3/1016* (2013.01); *F16M 11/10* (2013.01); *Y02T 50/44* (2013.01)

(56) References Cited

U.S. PATENT DOCUMENTS

| | | | |
|---|---|---|---|
| 4,140,292 A | | 2/1979 | Kaigler, Jr. |
| 4,417,755 A | * | 11/1983 | Gittleman .............. 285/373 |
| 4,490,888 A | | 1/1985 | Levant |
| 4,921,191 A | | 5/1990 | Herschler et al. |
| 5,014,940 A | * | 5/1991 | Sherman ............... 248/74.1 |
| 5,138,134 A | * | 8/1992 | Ellison ................. 392/448 |
| 5,215,281 A | * | 6/1993 | Sherman ............... 248/74.1 |
| 6,924,432 B1 | * | 8/2005 | Connors ................ 174/660 |
| 7,350,755 B1 | * | 4/2008 | Harrison ............... 248/230.6 |
| 7,926,766 B2 | * | 4/2011 | Tjerrild ................ 248/58 |
| 2007/0158506 A1 | * | 7/2007 | Trotter et al. ........... 248/65 |
| 2009/0140106 A1 | * | 6/2009 | Johnson et al. ......... 248/55 |
| 2011/0284694 A1 | | 11/2011 | Yamaguchi et al. |

FOREIGN PATENT DOCUMENTS

| | | |
|---|---|---|
| GB | 2 093 130 A | 8/1982 |
| JP | 54-124324 | 9/1979 |
| JP | 58-8887 | 1/1983 |
| JP | 58-200891 | 11/1983 |
| JP | 60-89485 | 6/1985 |
| JP | 10-292817 | 11/1998 |
| JP | 2010-126133 | 6/2010 |
| JP | 2010-201943 | 9/2010 |

OTHER PUBLICATIONS

International Search Report issued Dec. 20, 2011 in International (PCT) Application No. PCT/JP2011/074342.
Chinese Notice of Allowance issued Jan. 20, 2015 in corresponding Chinese Patent Application No. 201180048754.9 with partial English translation.
International Preliminary Report on Patentability and Written Opinion of the International Searching Authority issued May 14, 2013 in International (PCT) Application No. PCT/JP2011/074342.
Chinese Office Action issued May 6, 2014 in corresponding Chinese Patent Application No. 201180048754.9 with partial English translation.
Notice of Allowance issued Aug. 26, 2015, in corresponding Canadian Application No. 2,813,917.
Japanese Decision to Grant a Patent, issued Apr. 7, 2015, in corresponding Japanese Application No. 2010-239961 (with partial English translation).

\* cited by examiner

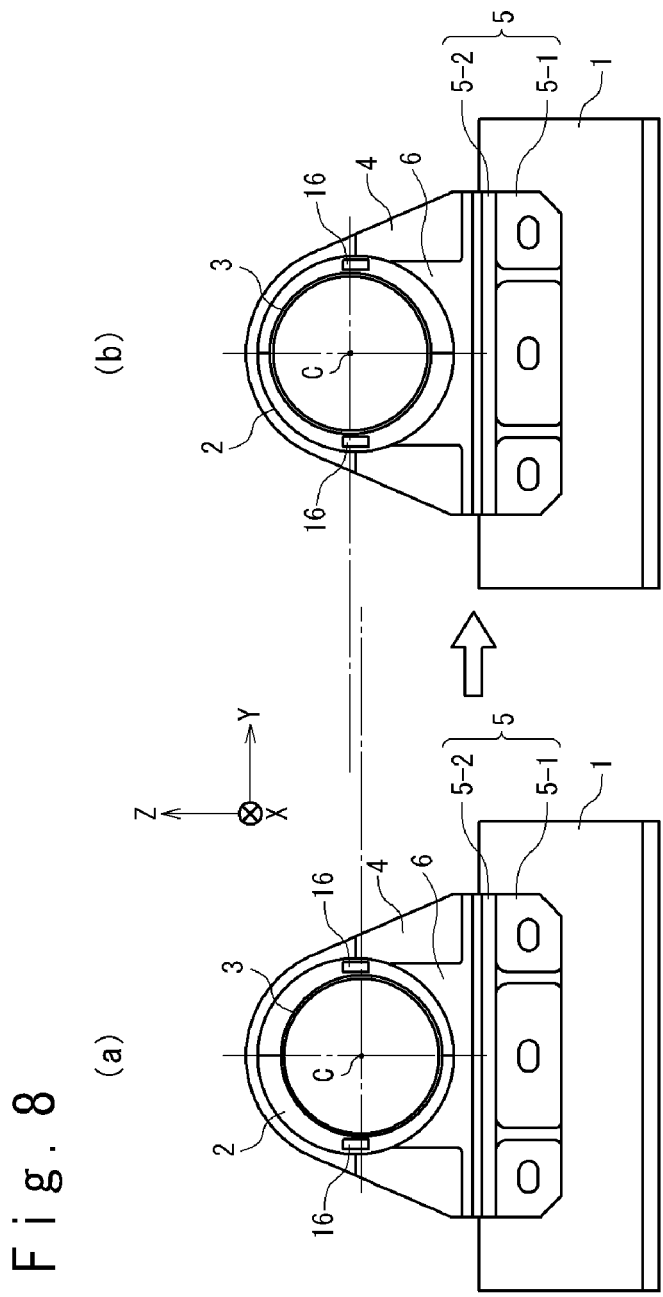

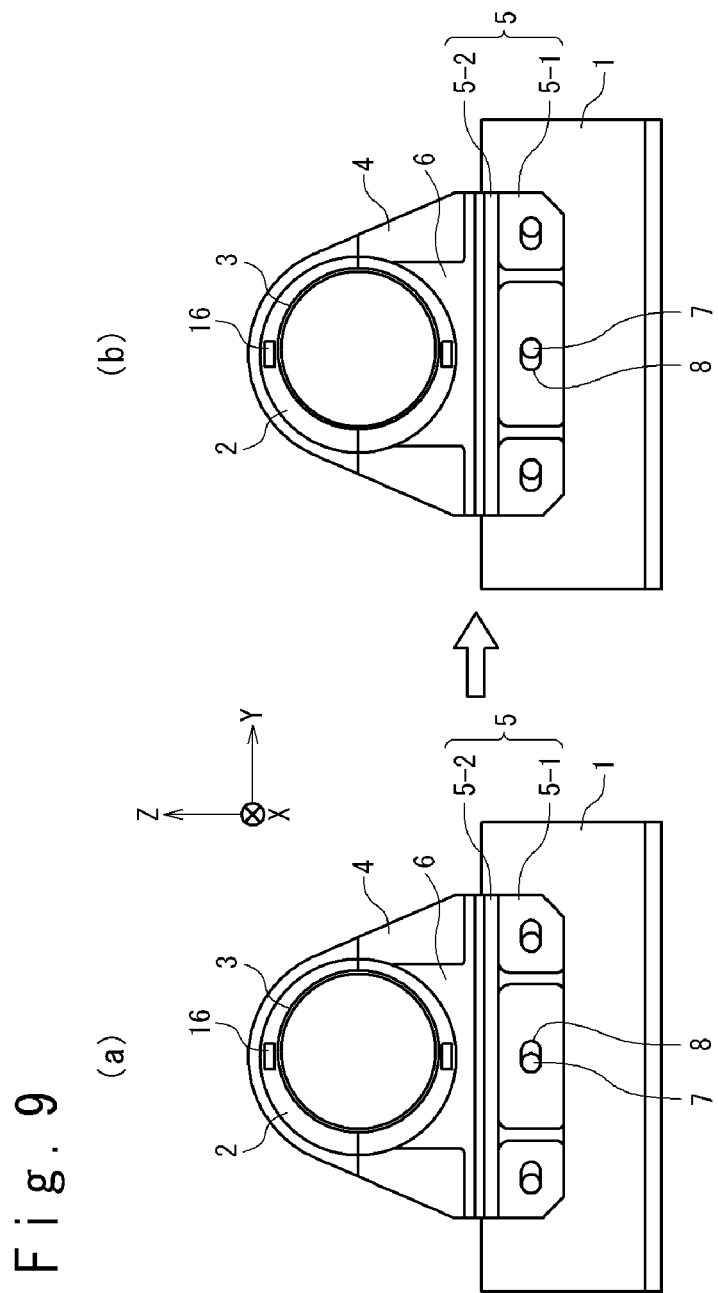

TUBE SUPPORT STRUCTURE FOR AIRCRAFT

TECHNICAL FIELD

The present invention relates to a tube support structure for an aircraft.

BACKGROUND ART

Many tubes, such as a fuel supplying tube and the like, are arranged inside an aircraft. In order to support the foregoing tubes, a tube support structure is provided inside the aircraft.

For the tube support structure, a preload applied to a tube is required to be suppressed. Moreover, there is a case that the aircraft is deflected by lifting power and the like received during its flight. In particular, a main wing portion is easily bent by a load such as lifting power generated during operations. With the deflection in an airframe, the tube receives a load at a portion of the tube support structure. When the preload exists in the tube, in addition to the load caused by the deflection in the airframe, a load corresponding to the preload is applied to the tube. Moreover, the aircraft repeats its takeoff and landing. This implies that the load caused by the deflection of the airframe is repeatedly applied to the tubes arranged inside the aircraft. From the foregoing viewpoints, for the tube support structure for aircraft, the suppression of the preload is strongly requested as compared with the tube support structures in other use fields.

FIG. 1 is a view schematically showing a tube arranged inside an aircraft. As shown in FIG. 1, a tube 103 is arranged inside a main wing of an aircraft 100. Also, ribs 102 for partitioning inner space of the main wing are provided inside the main wing. The tube 103 extends to penetrate through the ribs 102. A tube support structure 109 is attached to the ribs 102. The tube 103 is supported by the tube support structure 109.

FIG. 2 is a schematic view showing the tube support structure 109. In FIG. 2, an X direction, a Y direction and a Z direction are defined. The tube 103 extends along the X direction. The rib 102 is arranged in parallel to an YZ plane. The tube support structure 109 has a bracket 104, a shim 105 and a clamp 106. The bracket 104 is bent, and has a fixing portion fixed to the rib 102 and an attachment surface extending along the tube 103. The clamp 106 is a portion supporting the tube 103 and arranged on the attachment surface of the bracket 104. The shim 105 is used to adjust a position of the clamp 106 in the Z direction and interposed between the attachment surface of the bracket 104 and the clamp 106. When the foregoing configuration is employed, by using a member with a thickness suitable for the shim 105, the position of the clamp 106 can be adjusted in an upper and lower direction (Z direction) and can suppress the preload. Also, by using a member having a suitable bent angle as the bracket 104, an angle of the tube 103 can be adjusted with respect to the rib 102. Thus, the preload can be suppressed.

As another related technique, a patent literature 1 (JP S58-200891A) discloses a center self-adjustment multi-connector. The patent literature 1 describes a configuration that a plurality of female couplings are attached to a male block so as to oscillate in arbitrary directions through a spherical supporting portion, a configuration that a plurality of female couplings to be engaged with a male coupling are attached to a female block so as to oscillate in arbitrary directions through a spherical supporting portion, a configuration that centering engagement portions are provided in the male block and the female block, and a configuration that a lock member 3 for holding the male block and the female block at a coupling position is movably mounted in any one of the male block and the female block.

As still another related technique, a patent literature 2 (JP H10-292817A) discloses a journal bearing that has a center adjustment mechanism. The patent literature 2 discloses a journal bearing that is provided with a support ring, a bearing, an oil groove portion and a mechanism for supplying high pressure oil to the oil groove portion, wherein a support portion between an inner surface of the support ring and an outer surface of the bearing is formed by a spherical surface.

CITATION LIST

Patent Literature

Patent Literature 1: JP S58-200891A
Patent Literature 2: JP H10-292817A

SUMMARY OF THE INVENTION

However, in the example shown in FIG. 2, for the position adjustment in the Z direction, the shims 105 having a variety of thicknesses should be prepared. In addition, the position of the clamp 106 in the Z direction is dependent on the thickness of the shim 105 and cannot be adjusted continuously. Thus, in most cases, the small preload is generated in the tube 103.

Similarly, in the example shown in FIG. 2, for the attachment angle adjustment of the tube 103, a variety of the brackets 104 having various angles should be prepared. Thus, a cost for producing the bracket 104 is increased. Further, many brackets 104 whose shapes are similar to each other but bent angles are different from each other should be prepared. Thus, attachment mistakes may occur. In addition, the angle of the tube 103 cannot be adjusted continuously. Thus, the small preload is generated in the tube 103.

Therefore, an object of the present invention is to provide a tube support structure for aircraft which can suppress a preload.

Here, in the patent literature 1, a center self-adjustment multi-connector, which is used in petroleum production facilities provided in a bottom of the sea, is described. However, a tube support structure, which is used for supporting a tube arranged inside an aircraft.

Here, in the patent literature 2, a journal bearing, which is used for supporting a rotation axis of a large scale rotating machine such as a turbine, is described. However, a tube support structure, which is used for supporting a tube arranged inside an aircraft.

A tube support structure for an aircraft according to the present invention supports a tube arranged so as to be extend in an X direction inside an aircraft. The tube support structure for an aircraft includes: a parallel movement mechanism configured to support the tube movably in parallel; and an angle adjustment mechanism configured to support the tube angle-adjustably. The parallel movement mechanism includes: an eccentric sleeve, through which the tube passes, configured to adjust a position of the tube in a Z direction perpendicular to the X direction, and a Y direction adjustment mechanism configured to adjust a position of the eccentric sleeve in a Y direction perpendicular to the X direction and the Z direction. The angle adjustment mechanism includes: a first member configured to have a first curved surface and support the tube, and a second member configured to have a second curved surface with a shape corresponding to the first curved surface, have contact slidably with the first curved surface at the second curved surface, and support the first member by the second curved surface. The first curved surface and the second curved surface are formed such that a cross-sectional shape in an XZ plane is a circular arc shape. An angle of the tube is adjusted by sliding the first curved surface with respect to the second curved surface.

According to the present invention, since the tube passes through the eccentric sleeve, the position of the tube can be adjusted in the Z direction by rotating the eccentric sleeve. By using the eccentric sleeve, the position of the tube can be adjusted continuously, thereby suppressing occurrence of a preload.

In the case that the position is adjusted in the Z direction by using the eccentric sleeve, the position in the Y direction may also be shifted. However, in the present invention, by using the Y direction adjustment mechanism, the position in the Y direction can be adjusted. That is, the position shift in the Y direction caused by the rotation of the eccentric sleeve can be corrected by the Y direction adjustment mechanism.

In addition, according to the present invention, the second member supports the first curved surface of the first member slidably by the second curved surface. The first curved surface and the second curved surface are formed such that a cross-sectional shape in the XZ plane is a circular arc shape. Therefore, by sliding the first curved surface with respect to the second curved surface, the angle of the tube can be adjusted can be adjusted continuously, thereby suppressing occurrence of a preload.

According to the present invention, a tube support structure for aircraft, which can suppress a preload, is provided.

BRIEF DESCRIPTION OF DRAWINGS

FIG. 8 is an explanation view for explaining a position adjusting operation in a Z direction.

FIG. 9 is an explanation view for explaining a position adjusting operation in a Y direction.

DESCRIPTION OF EMBODIMENTS

The embodiments of the present invention will be described below with reference to the drawings.

First Embodiment

Figure 1:
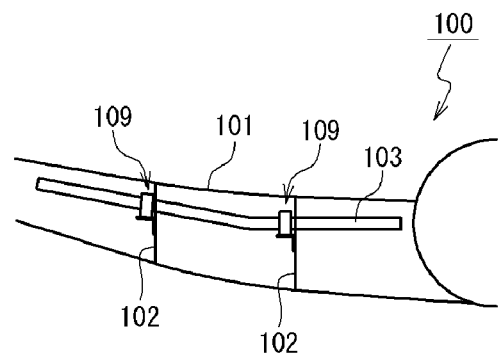
FIG. 1 is the view schematically showing a tube arranged inside an aircraft.
Figure 2:
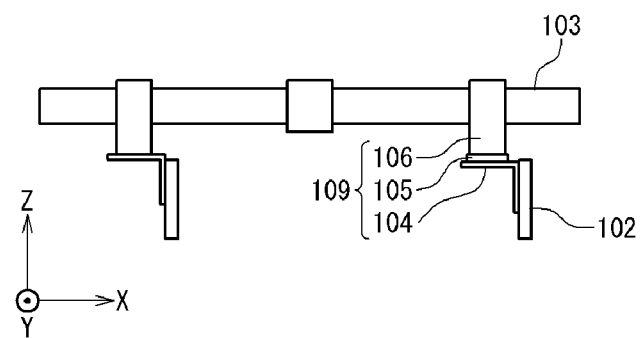
FIG. 2 is the schematic view showing a tube support structure.

A tube support structure according to the present embodiment is used to support a tube arranged inside a main wing in an aircraft, as shown in FIG. 1. The main wing in the aircraft is assumed to be made of CFRP (Carbon Fiber Reinforced Plastic).

Figure 3:
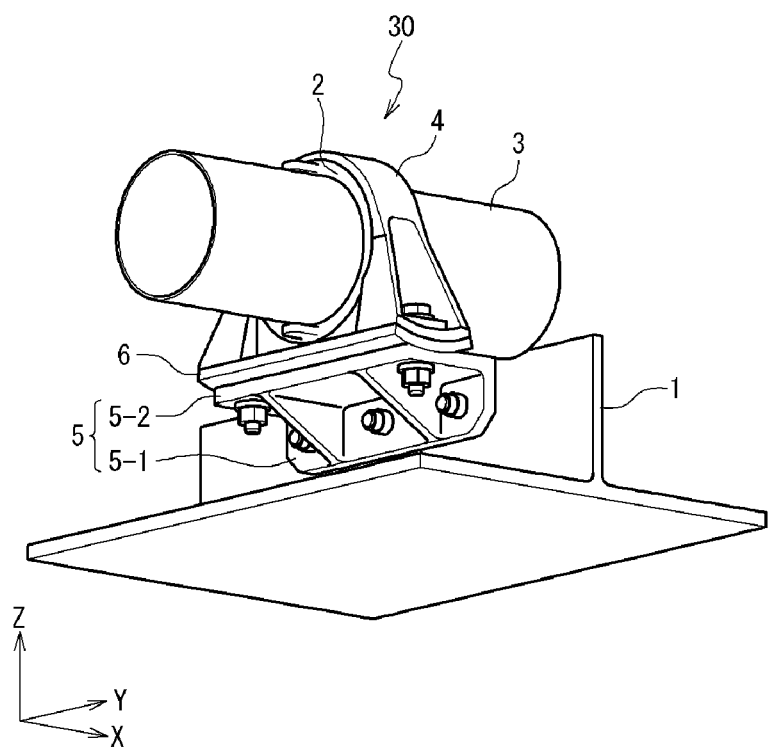
FIG. 3 is a perspective view showing a tube support structure according to a first embodiment.

FIG. 3 is a perspective view showing a tube support structure 30 according to the present embodiment. In FIG. 3, an X direction, a Y direction and a Z direction which are orthogonal to one another are defined. This tube support structure 30 is attached to a structure body 1. The structure body 1 is fixed to an airframe, has a shape of a flat plate and is arranged in parallel to an XZ plane. The tube support structure 30 supports a tube 3 extending along the X direction, above the structure body 1 (the Z direction side).

Figure 4:
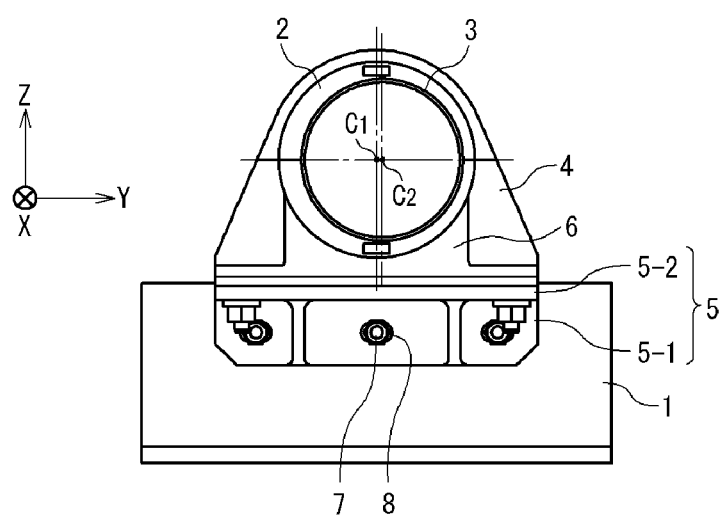
FIG. 4 is a sectional view showing an YZ cross-section of the tube support structure.
Figure 5:
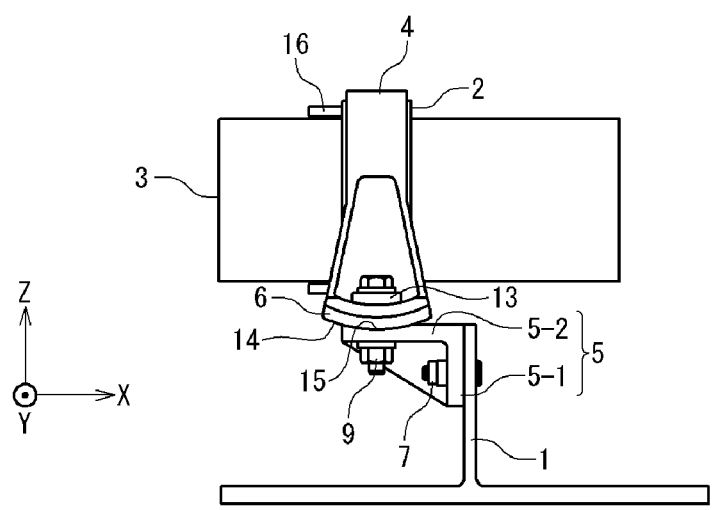
FIG. 5 is a view when the tube support structure is viewed from a Y direction side.
Figure 6:
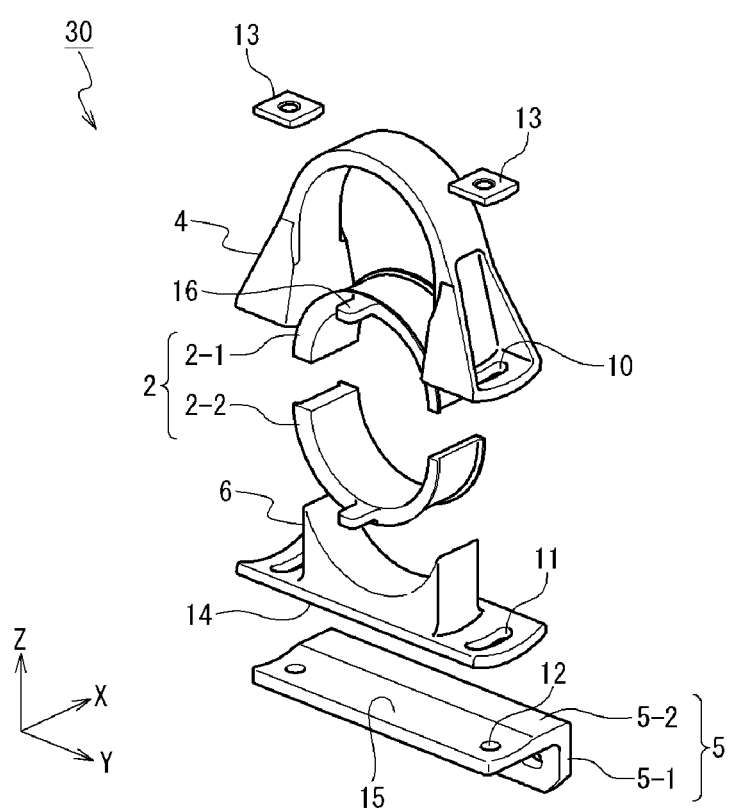
FIG. 6 is an exploded perspective view of the tube support structure.

FIG. 4 is a cross-sectional view showing an YZ section of the tube support structure 30. FIG. 5 is the view when the tube support structure 30 is viewed from the Y direction side. FIG. 6 is the exploded perspective view of the tube support structure 30. The configuration of the tube support structure 30 is explained with reference to FIGS. 3 to 6.

As shown in FIG. 6, the tube support structure 30 has a bracket 5 (second member), a saddle 6 (first member), an eccentric sleeve 2 and a strap 4.

The bracket 5 is a portion fixed to the structure body 1. As shown in FIG. 5, the bracket 5 includes a fixing portion 5-1 and an attachment portion 5-2, and is bent between the fixing portion 5-1 and the attachment portion 5-2.

The fixing portion 5-1 overlaps with the structure body 1. As shown in FIG. 4, an elongate hole 8 extending along the Y direction is made in the fixing portion 5-1. A fastening member 7 (a bolt and a nut) for tightly fastening the fixing portion 5-1 to the structure body 1 is inserted in this elongate hole 8. A length in the Y direction of the elongate hole 8 is larger than a width of an axial portion (a portion inserted in the elongate hole 8) of the fastening member 7.

The attachment portion 5-2 is a portion for supporting the saddle 6 and the like. The attachment portion 5-2 extends in parallel to an XY plane. As shown in FIG. 6, a saddle support surface 15 (second curved surface) is formed on the top surface of the attachment portion 5-2. As shown in FIG. 5, the saddle support surface 15 is a curved surface and formed such that an XZ cross-section becomes a circular arc shape. Specifically, as shown in FIG. 6, the saddle support surface 15 has a shape corresponding to a cylinder surface (an outer circumference surface of a cylinder who se central axis is in the Y direction). Also, holes 12 are made in both ends of the attachment portion 5-2 in the Y direction.

The saddle 6 is a portion to support the eccentric sleeve 2 and supported by the bracket 5. As shown in FIG. 6, a bottom surface of the saddle 6 (a saddle bottom surface 14; a first curved surface) is a curved surface corresponding to the saddle support surface 15. In the saddle 6, the saddle bottom surface 14 is supported by the saddle support surface 15. Also, in the saddle 6, holes 11 are made at positions corresponding to the holes 12 made in the bracket 5. Moreover, an eccentric sleeve support surface to support the eccentric sleeve 2 is formed on a top surface of the saddle 6.

The eccentric sleeve 2 is provided to adjust a position of the tube 3 in the Z direction. The eccentric sleeve 2 is supported by the saddle 6. The eccentric sleeve 2 has a shape of a circular ring. As shown in FIG. 4, in the eccentric sleeve 2, a center C2 of an inner circumference surface is shifted from a center C1 of an outer circumference surface. The tube 3 passes through the eccentric sleeve 2. Consequently, the tube 3 is supported by the eccentric sleeve 2. Also, as shown in FIGS. 5 and 6, holding portions 16 extending along the X direction are provided with the eccentric sleeve 2. Moreover, as shown in FIG. 6, the eccentric sleeve 2 is divided into a first portion 2-1 and a second portion 2-2. Since the eccentric sleeve 2 is divided into two portions, the eccentric sleeve 2 can be attached around the tube 3 without moving the tube 3.

The strap 4 is provided to protect the eccentric sleeve 2 from dropping. The strap 4 is arranged so as to cover the outer circumference surface of the eccentric sleeve 2 and supported by the saddle 6. As shown in FIG. 6, holes 10 are made at positions at which each of the holes 10 overlaps with the hole 11 and the hole 12, at both ends in the Y direction of the strap 4. Also, a special washer 13 is arranged on each of the holes 10. As shown in FIG. 5, a fastening member 9 (a bolt and a nut) is provided so as to penetrate through the special washer 13 and the holes 10, 11 and 12. The strap 4 is fixed to the bracket 5 with the fastening member 9. Also, the saddle 6 is sandwiched and fixed between the bracket 5 and the strap 4.

Since to the foregoing configuration is employed, an angel of the tube 3 can be freely adjusted with respect to the structure body 1 when the aircraft is rigged with the tube 3 in the airframe. This mechanism will be described below.

Figure 7A:
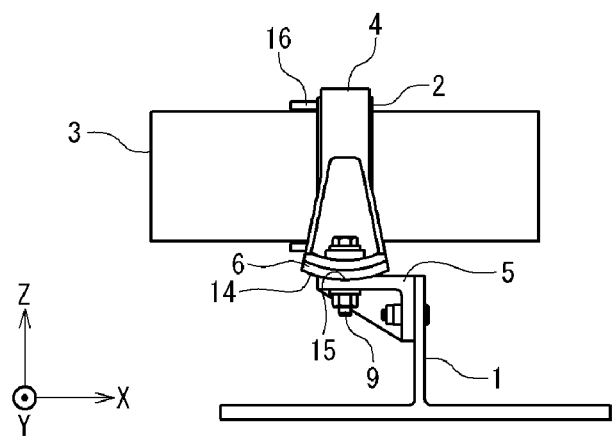
FIG. 7A is an explanation view for explaining an angle adjusting function.
Figure 7B:
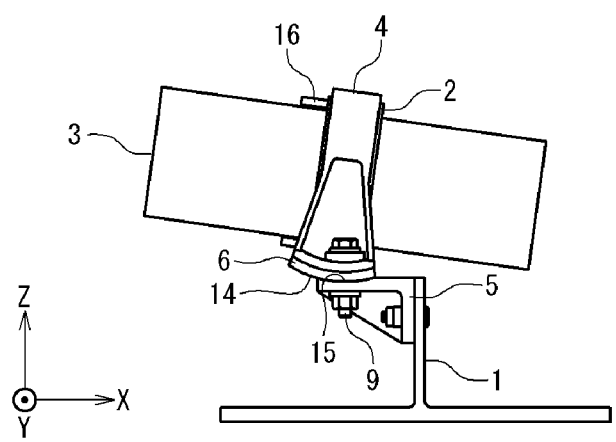
FIG. 7B is an explanation view for explaining the angle adjusting function.

FIGS. 7A and 7B are an explanation views for explaining an angle adjusting function. As shown in FIG. 7A, the tube 3 extends along the X direction. Here, when the angle of the tube 3 is adjusted with respect to the structure body 1, the fastening member 9 is firstly loosed. Consequently, the saddle bottom surface 14 can be slid against the saddle support surface 15 formed on the bracket 5. Thus, as shown in FIG. 7B, when the saddle 6 is slid against the bracket 5, the angle of the tube 3 with respect to the structure body 1 can be adjusted continuously on the XZ flat plane. After the angle of the tube 3 is adjusted, the fastening member 9 is fastened, and the saddle 6 is fixed to the bracket 5. Consequently, the tube 3 can be fixed in a situation in which the preload is suppressed.

Also, according to the embodiment, by operating the eccentric sleeve 2, the position of the tube 3 can be adjusted in the Z direction. FIG. 8 is an explanation view for explaining the position adjusting operation in the Z direction. As shown in (a) of FIG. 8, the tube 3 has contact with the inner circumference surface of the eccentric sleeve 2. The (a) of FIG. 8 shows a central axis c of the tube 3. Here, when the position of the tube 3 is adjusted in the Z direction, the holding portion 16 is grasped to make the eccentric sleeve 2 rotate. Then, as shown in (b) of FIG. 8, the center of the inner circumference surface of the eccentric sleeve 2 is changed in the Z direction. Thus, the position of the central axis c of the tube 3 is also changed in the Z direction. Consequently, in the Z direction, the position of the tube 3 can be adjusted continuously.

However, when the eccentric sleeve 2 is made to rotate, the position of the tube 3 is shifted not only in the Z direction but also in the Y direction. However, in the present embodiment, by using the elongate hole 8 made in the bracket 5, the position of the tube 3 can be adjusted in the Y direction. FIG. 9 is an explanation view for explaining the position adjusting operation in the Y direction. As mentioned above, the width of the axial portion of the fastening member 7 inserted in the elongate hole 8 is shorter than the length of the elongate hole 8 in the Y direction (refer to (a) of FIG. 9). Thus, by loosing the fastening member 7, as shown in (b) of FIG. 9, the position of the bracket 5 can be shifted with respect to the structure body 1 in the Y direction. Since the position of the bracket 5 is shifted, the position of the tube support structure 30 is shifted entirely in the Y direction, and the position of the tube 3 is adjusted in the Y direction. For this reason, even if the operation of the eccentric sleeve 2 causes the position of the tube 3 to be shifted in the Y direction, the tube 3 can be returned to a position at which the preload does not occur. That is, the tube 3 can be moved freely in the Y direction and the Z direction. That is, the tube 3 can be moved in parallel freely.

As mentioned above, according to the present embodiment, the saddle 6 can be slid against the bracket 5. Thus, the angle of the tube 3 can be adjusted continuously. Consequently, the tube 3 can be supported at the angle at which the preload is not generated. Also, it is not required to prepare a plurality of kinds of brackets, whose bent angles are different from each other, as the bracket 5. By using the brackets 5 whose shapes are identical, the tube 3 can be supported at desirable angles.

In addition, according to the present embodiment, since the eccentric sleeve 2 and the elongate hole 8 are provided, the tube 3 can be moved parallel continuously. Thus, the tube 3 can be supported at the position at which the preload is not generated.

Incidentally, the present embodiment is explained about the case that the elongate hole 8 is made in order to adjust the tube 3 in the Y direction. However, the Y direction adjustment mechanism is not limited to the elongate hole 8 and another configuration may be used to attain the Y direction adjustment mechanism. For example, instead of the elongate hole 8, an eccentric sleeve may be provided in the fixing portion 5-1, and the fastening member 9 may be inserted in this eccentric sleeve. Even if the foregoing configuration is employed, the position of the tube 3 can be adjusted freely in the Y direction.

Also, this case is explained about the case that the tube 3 is arranged inside the main wing made of the CFRP in the aircraft. The main wing made of the CFRP is easily bent as compared with a main wing made of metal (aluminum). For this reason, a load is easily applied to even the tube 3 arranged in the main wing. Thus, it is strongly required to suppress the preload when supporting the tube 3. In the tube support structure 30 according to the present embodiment, it is possible to adjust the angle of the tube 3 without discrete steps and perform a parallel movement on the tube 3 without discrete steps. For this reason, the generation of the preload can be extremely decreased. Hence, the tube support structure can be preferably used for an application for supporting the tube 3 arranged inside the main wing made of the CFRP of the aircraft. However, even in a case that the airframe is made of metal or a case that the tube 3 is arranged in a fuselage, the great load caused by the deflection of the airframe is applied to the tube 3. For this reason, the tube support structure 30 according to the present embodiment is preferably applied not only to the tube 3 arranged inside the main wing made of the CFRP, but also to the entire tube arranged inside the aircraft.

Variation Example in First Embodiment

The present embodiment is described about the case that the tube 3 is supported above the structure body 1. However, even in a case that the tube 3 extends to penetrate through the structure body 1, the tube support structure 30 according to the present embodiment can be applied.

Figure 10:
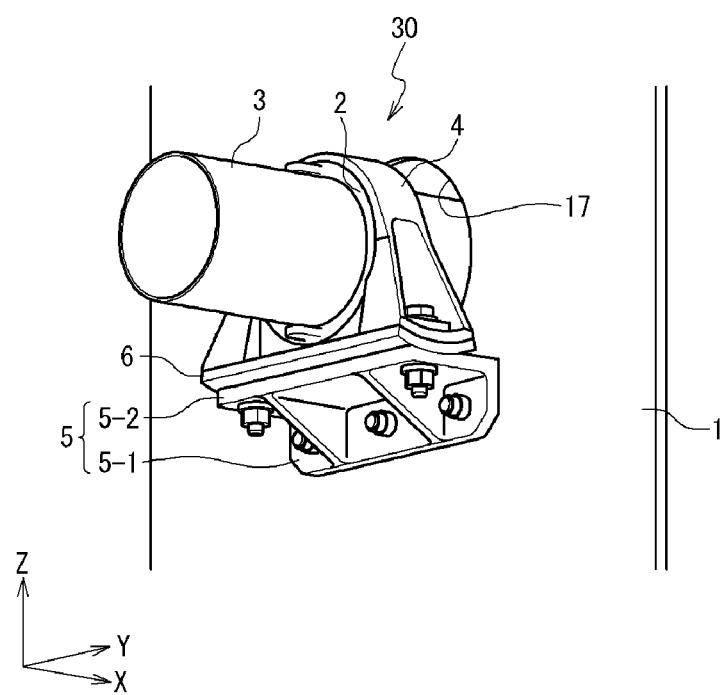
FIG. 10 is a perspective view showing a tube support structure according to a variation example in the first embodiment.

FIG. 10 is a perspective view showing a tube support structure 30 according to the variation example in the present embodiment. As shown in FIG. 10, in this variation example, a hole 17 is made in the structure body 1. Then, the tube 3 extends through the hole 17. The hole 17 is made slightly larger than an outer diameter of the tube so that, when the position is adjusted, it does not interfere with the tube 3. With the employment of the foregoing configuration, even if the tube 3 extends to penetrate through the structure body 1, the tube support structure 30 according to the present embodiment can be applied.

Second Embodiment

Next, a second embodiment will be described.

Figure 11:
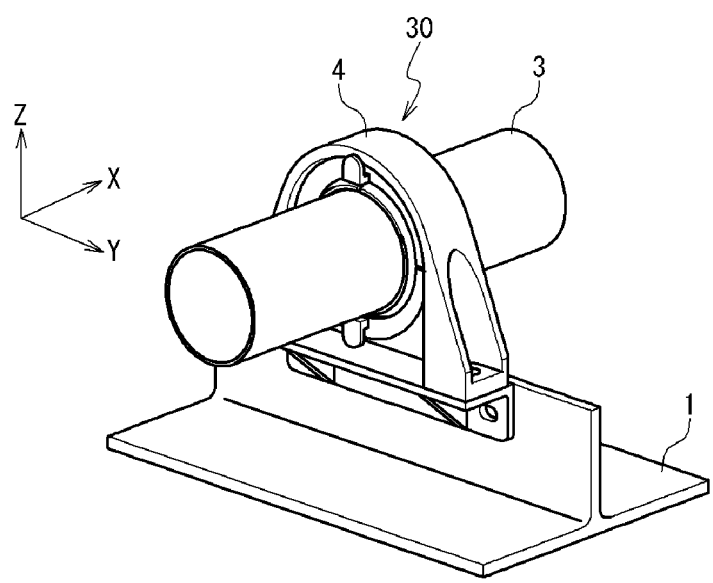
FIG. 11 is a perspective view showing a tube support structure according to a second embodiment.
Figure 12:
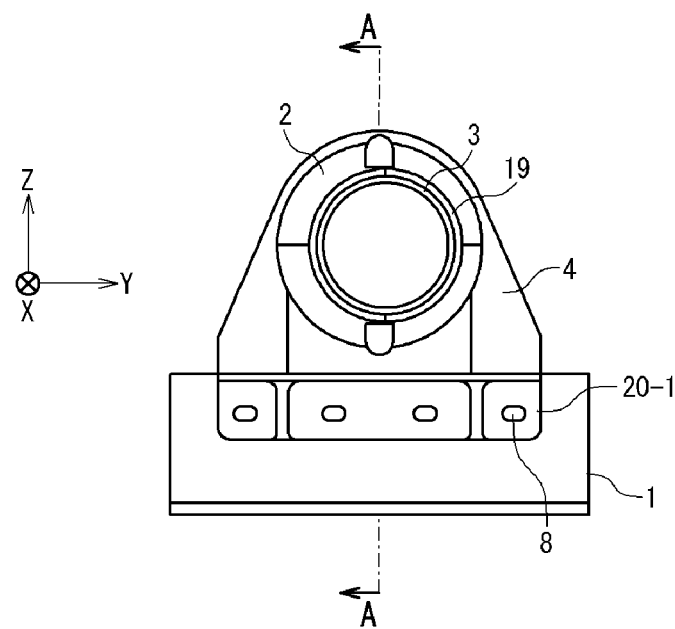
FIG. 12 is a cross-sectional view of the tube support structure on an YZ plane.
Figure 13:
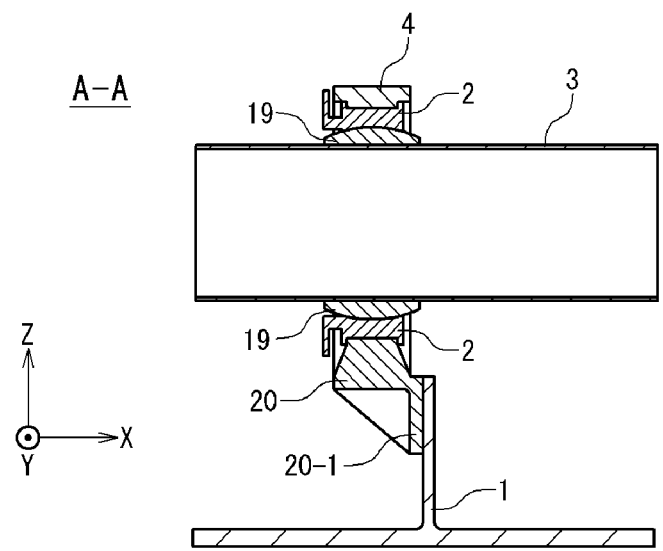
FIG. 13 is a cross-sectional view of the tube support structure on an XZ plane.
Figure 14:
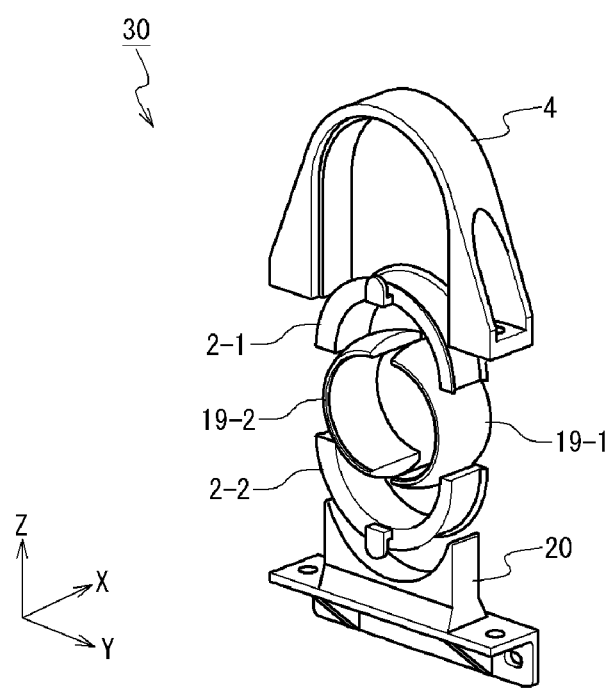
FIG. 14 is an exploded perspective view showing the tube support structure.

FIG. 11 is a perspective view showing a tube support structure 30 according to the present embodiment. FIG. 12 is a cross-sectional view of the tube support structure 30 in the YZ plane. FIG. 13 is a cross-sectional view of the tube support structure 30 on the XZ plane. FIG. 14 is an exploded perspective view showing the tube support structure 30.

As shown in FIG. 14, in the present embodiment, a spherical sleeve (first member) 19 (19-1, 19-2) is provided on the inner side of the eccentric sleeve 2 (second member). The tube 3 penetrates through the spherical sleeve 19 and is supported by the spherical sleeve 19. Also, an eccentric sleeve support member 20 is used instead of the saddle 6 and the bracket 5. Since the other configurations can be made similar to the first embodiment, their detailed explanations are omitted.

The eccentric sleeve support member 20 is such that the saddle 6 and the bracket 5 in the first embodiment are integrated into a single unit. That is, the eccentric sleeve support member 20 has an eccentric sleeve support surface which has contact with the outer circumference surface of the eccentric sleeve 2, and supports the eccentric sleeve 2 by the eccentric sleeve support surface. Also, a fixing portion 20-1 overlapping with the structure body 1 is provided in the eccentric sleeve support member (refer to FIG. 13). The elongate hole 8 in which the fastening member 7 is inserted is made in the fixing portion 20-1 (refer to FIG. 12). The shapes of the fixing portion 20-1 and the elongate hole 8 are similar to those of the first embodiment.

As shown in FIG. 14, in the eccentric sleeve 2, the outer circumference surface has contact with and is supported by the eccentric sleeve support member 20. The outer circumference surface of the eccentric sleeve 2 is the circular cylindrical surface. On the other hand, as shown in FIG. 13, the inner circumference surface of the eccentric sleeve 2 is the curved surface in which the XZ cross section has a circular arc shape. Specifically, the inner circumference surface (second curved surface) of the eccentric sleeve 2 has a shape along a spherical surface. Also, as shown in FIG. 12, similarly to the first embodiment, in the eccentric sleeve 2, a center with respect to the inner circumference surface is shifted from a center with respect to the outer circumference surface.

The spherical sleeve 19 is cylindrical as shown in FIG. 14 and has an inner circumference surface and an outer circumference surface. As shown in FIG. 13, the outer circumference surface (first curved surface) of the spherical sleeve 19 has a shape corresponding to the inner circumference surface of the eccentric sleeve 2. That is, the outer circumference surface of the spherical sleeve 19 has a shape along the spherical surface. In the spherical sleeve 19, the outer circumference surface has contact with the inner circumference surface of the eccentric sleeve 2. The spherical sleeve 19 is slidably supported by the eccentric sleeve 2. On the other hand, the inner circumference surface of the spherical sleeve 19 is a circular cylindrical surface corresponding to the outer circumference surface of the tube 3. The tube 3 penetrates through the spherical sleeve 19 and is supported by the spherical sleeve 19. Incidentally, the spherical sleeve 19 is divided into two portions so that the spherical sleeve 19 can be easily attached to the tube 3 and has a first portion 19-1 and a second portion 19-2.

Figure 15A:
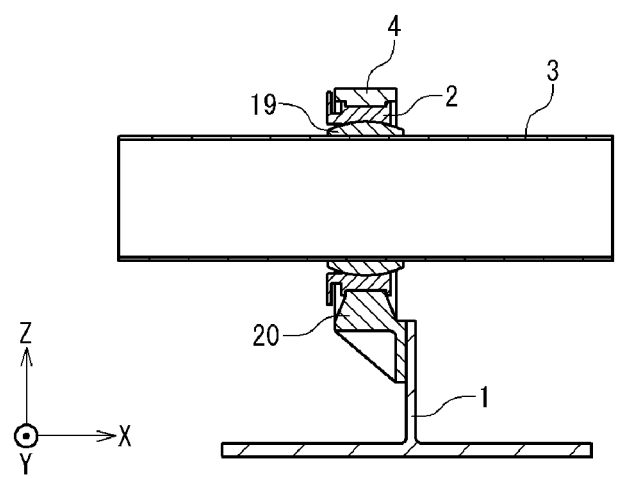
FIG. 15A is an explanation view for explaining an angle adjusting function in the second embodiment.
Figure 15B:
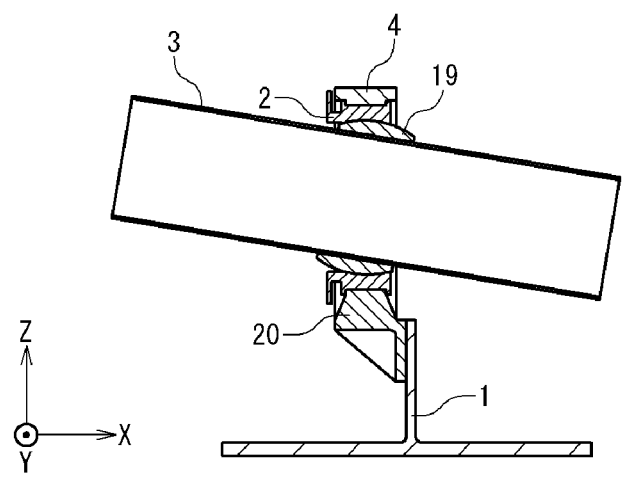
FIG. 15B is an explanation view for explaining the angle adjusting function in the second embodiment.

FIGS. 15A and 15B are the explanation views for explaining an angle adjusting function in the present embodiment.

Figure 16:
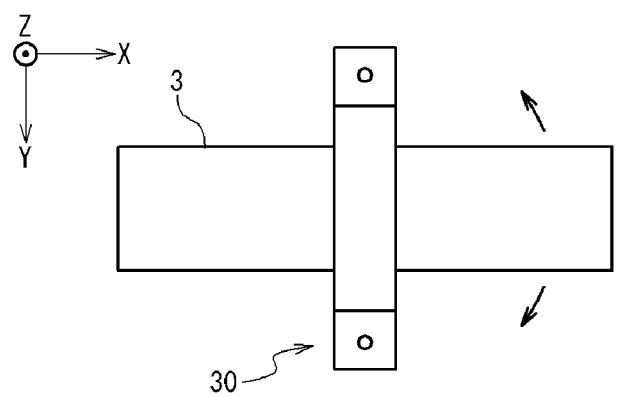
FIG. 16 is a view for explaining an angle adjusting operation of a tube 3.

As shown in FIGS. 15A and 15B, in the present embodiment, since the spherical sleeve 19 (first member) is slid against the eccentric sleeve 2 (second member), the angle of the tube 3 can be changed with respect to the structure body 1. Here, in the present embodiment, the inner circumference surface of the eccentric sleeve 2 and the outer circumference surface of the spherical sleeve 19 correspond to the spherical surface. For this reason, the angle of the tube 3 can be adjusted with flexibility greater than the first embodiment. That is, in the first embodiment, only in the XZ plane (only the case viewed along the Y direction), the angle of the tube 3 can be adjusted (refer to FIG. 7). On the contrary, in this embodiment, the eccentric sleeve 2 and the spherical sleeve 19 are in contact on the spherical surface. Thus, as shown in FIG. 16, even when it is viewed along the Z direction, the angle of the tube 3 can be adjusted. For this reason, the preload can be suppressed more surely.

Also, in the present embodiment, the spherical sleeve 19 is not fixed to the eccentric sleeve 2. For this reason, when the airframe is bent during the flight, the spherical sleeve 19 and the eccentric sleeve 2 are automatically slid. That is, not only during the rig of the tube 3 but also during the flight, the load applied to the tube 3 is automatically reduced. Thus, the strength required for the tube 3 can be decreased, which can make the weight of the tube 3 lighter.

Figure 17A:
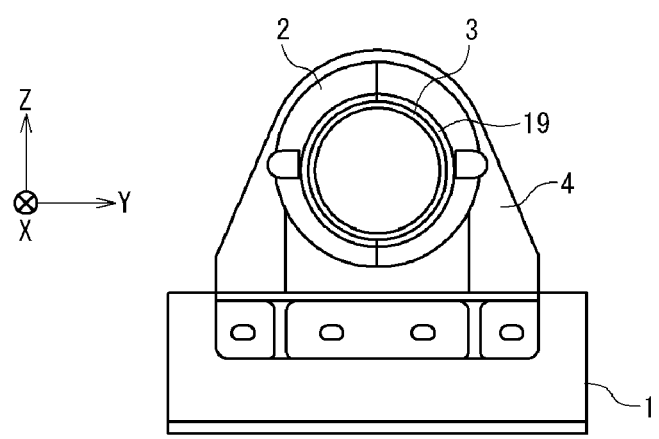
FIG. 17A is a view for explaining a position adjusting operation in the Z direction.
Figure 17B:
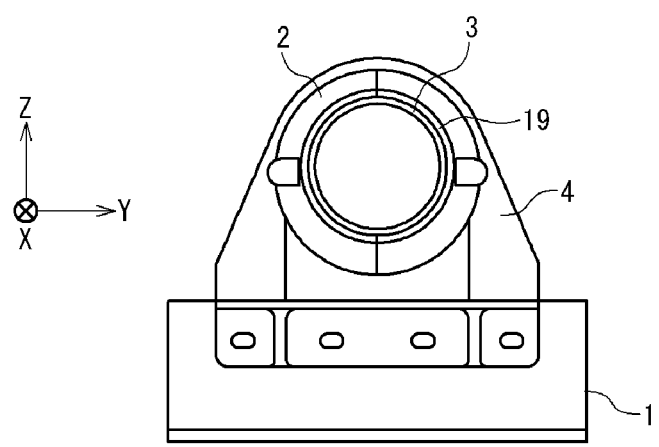
FIG. 17B is a view for explaining the position adjusting operation in the Z direction.
Figure 18A:
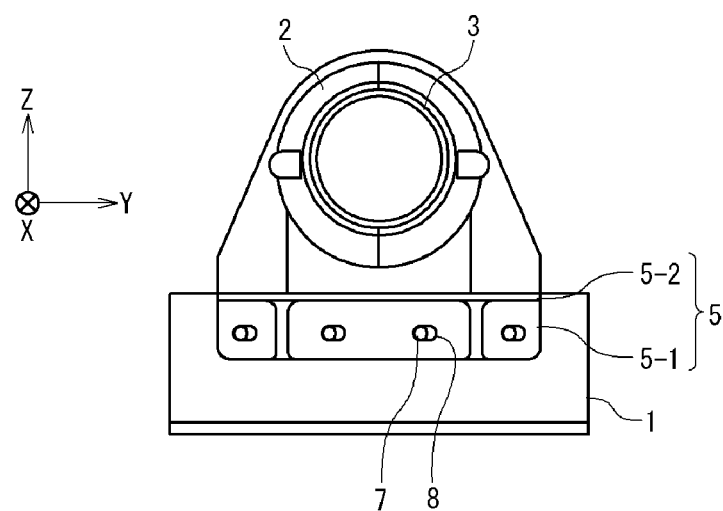
FIG. 18A is a view for explaining a position adjusting operation in the Y direction.
Figure 18B:
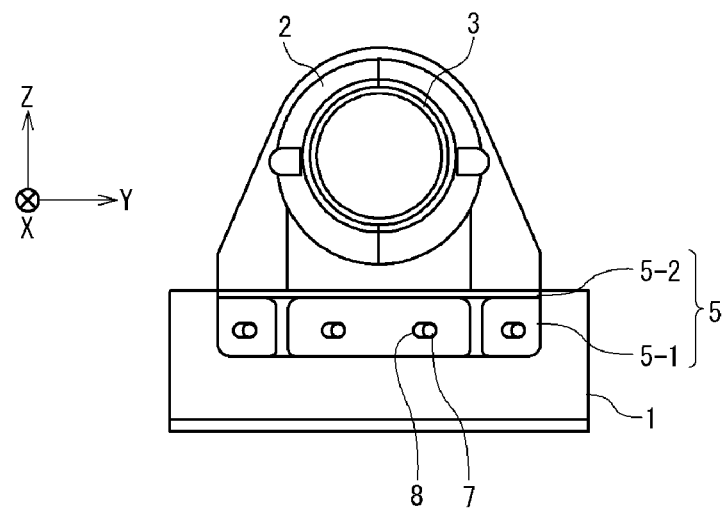
FIG. 18B is a view for explaining the position adjusting operation in the Y direction.

Incidentally, even in the present embodiment, as shown in FIGS. 17A and 17B, by rotating the eccentric sleeve 2, it is possible to adjust the position of the tube 3 in the Z direction. Also, as shown in FIGS. 18A and 18B, the elongate hole 8 made in the eccentric sleeve support member 20 enables the position of the tube 3 to be adjusted in the Y direction.

Variation Example in Second Embodiment

Next, a variation example in the second embodiment will be described. In this variation example, a case that the tube 3 extends to penetrate through the structure body 1 will be explained.

Figure 19:
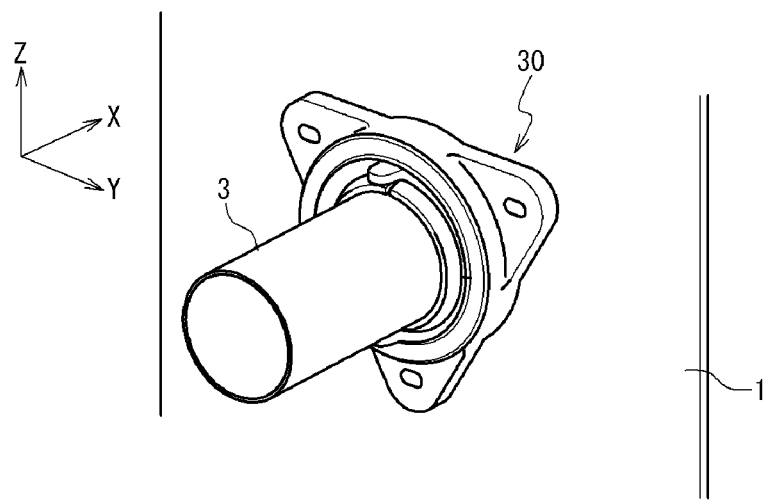
FIG. 19 is a perspective view showing a tube support structure according to a variation example in the second embodiment.
Figure 20:
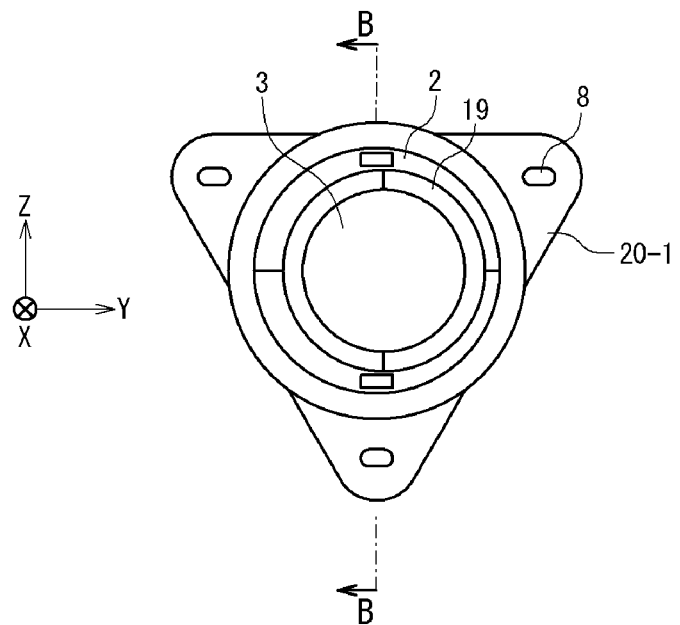
FIG. 20 is a cross-sectional view of the tube support structure on the YZ plane.
Figure 21:
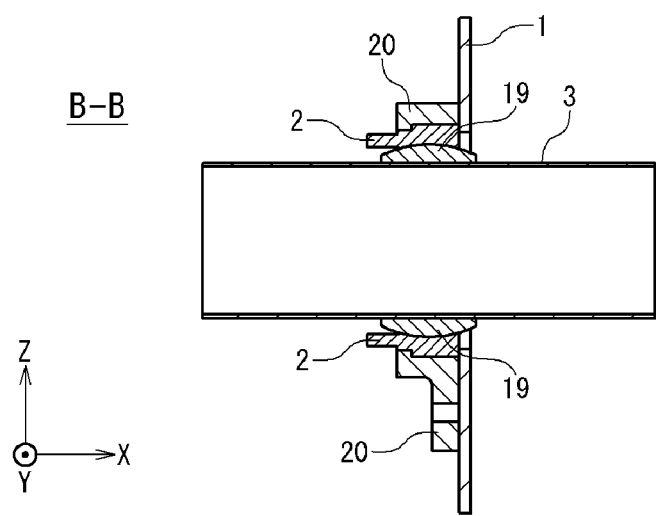
FIG. 21 is a cross-sectional view of the tube support structure in the XZ plane.
Figure 22:
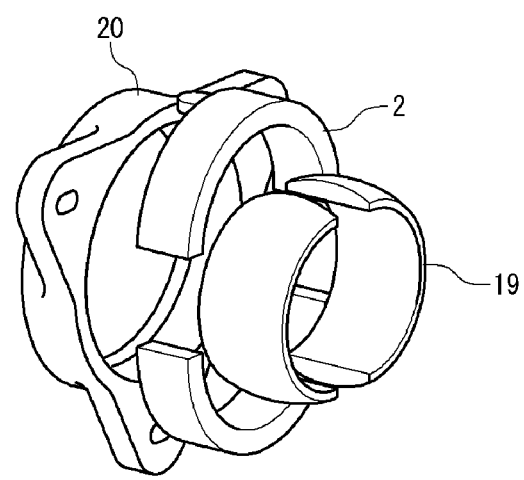
FIG. 22 is an exploded perspective view of the tube support structure.

FIG. 19 is a perspective view showing a tube support structure 30 according to the present embodiment. FIG. 20 is a cross-sectional view of the tube support structure 30 on the YZ plane. FIG. 21 is a cross-sectional view of the tube support structure 30 on the XZ plane. FIG. 22 is an exploded perspective view of the tube support structure 30.

As shown in FIGS. 19 to 22, in this variation example, a housing is used as the eccentric sleeve support member 20. Also, the strap 4 is deleted. As for the other configurations, it is possible to employ the configurations similar to the second embodiment. Thus, their detailed explanations are omitted.

The eccentric sleeve support member 20 has an opening with a shape corresponding to the outer circumference surface of the eccentric sleeve 2. The eccentric sleeve 2 is arranged inside the opening of this housing 20 and supported by a side wall of the opening. Incidentally, with regard to the eccentric sleeve 2 and the spherical sleeve 19, it is possible to employ the configurations similar to the second embodiment. Thus, their detailed explanations are omitted.

As shown in FIG. 20, the fixing portion 20-1 having a shape of a flat plate that overlaps with the structure body 1 is provided in the eccentric sleeve support member 20. Similarly to the second embodiment, the elongate hole 8 extending along the Y direction is made in the fixing portion 20-1. Also, similarly to the second embodiment, the fastening member 9 is inserted in the elongate hole 8. With the fastening member 9, the eccentric sleeve support member 20 is fixed to the structure body 1. Consequently, when the fastening member 9 is loosed, the eccentric sleeve support member 20 can be shifted with respect to the structure body 1 in the Y direction. Thus, the position of the tube 3 can be adjusted in the Y direction.

With the employment of the configuration indicated in this variation example, even if the tube 3 penetrates through the structure body 1, it is possible to obtain operation and effect similar to the second embodiment. Also, in this variation example, the strap 4 in the above-mentioned embodiments is eliminated. Thus, from the viewpoint that the number of parts can be reduced, this variation example is advantageous.

As mentioned above, the present invention has been described by using the first and second embodiments. Incidentally, the technical items used in those embodiments and variation examples are not independent of each other, and they can be combined with each other within a non-contradiction range.

This application is based upon and claims the benefit of priority from Japanese patent application No. 2010-239961 filed on Oct. 26, 2010, the disclosure of which is incorporated herein in its entirety by reference.

The invention claimed is:

1. A tube support structure for an aircraft, which supports a tube arranged to extend in an X direction inside an aircraft, the tube support structure comprising:
a parallel movement mechanism configured to support the tube and allow parallel movement of the tube; and
an angle adjustment mechanism configured to support the tube and allow an angle of the tube to be adjusted;
wherein the parallel movement mechanism includes:
an eccentric sleeve, through which the tube passes, configured to adjust a position of the tube in a Z direction perpendicular to the X direction, and
a Y direction adjustment mechanism configured to adjust a position of the eccentric sleeve in a Y direction perpendicular to the X direction and the Z direction,
wherein the angle adjustment mechanism includes:
a first member configured to have a first curved surface and support the tube, and
a second member configured to have a second curved surface with a shape corresponding to the first curved surface, have contact slidably with the first curved surface at the second curved surface, and support the first member by the second curved surface,
wherein each of the first curved surface and the second curved surface is formed such that a cross-sectional shape in an XZ plane is a circular arc shape,
wherein the angle of the tube is adjusted by sliding the first curved surface with respect to the second curved surface,
wherein the second member is joined to a structure body fixed to an airframe,
wherein the Y direction adjustment mechanism is configured to shift a position of the second member with respect to the structure body in the Y direction, and
wherein each of the first curved surface and the second curved surface has a shape that corresponds to a portion of an outer circumference surface of an imaginary cylinder with a central axis in the Y direction, the portion extending along the Y direction.

2. The tube support structure for an aircraft according to claim 1,
wherein the tube is supported so as to have contact with an inner circumference surface of the eccentric sleeve, and
wherein the first member is configured so as to have contact with the eccentric sleeve and support the tube through the eccentric sleeve.

3. The tube support structure for an aircraft according to claim 2,
wherein the first member includes a saddle configured to support the eccentric sleeve so as to have contact with an outer circumference surface of the eccentric sleeve,
wherein the first curved surface is formed in the saddle,
wherein the second member includes a bracket configured to support the saddle,
wherein the bracket includes an attachment portion and a fixing portion, and is bent between the attachment portion and the fixing portion,
wherein the second curved surface is formed in the attachment portion,
wherein the fixing portion is arranged so as to overlap with the structure body and is joined to the structure body.

4. The tube support structure for an aircraft according to claim 3,
wherein the Y direction adjustment mechanism has an elongate hole which is provided in the fixing portion and is extended along the Y direction, wherein the fixing portion is fastened to the structure body by a fastening member penetrating to the elongate hole, and wherein a length of the elongate hole is longer than a width of an axial portion of the fastening member in the Y direction.

5. An aircraft comprising:

the tube support structure for an aircraft according to claim 1;

a main wing; and a tube supported by the tube support structure and disposed inside the main wing.

6. The aircraft according to claim 5, wherein the main wing is made of CFRP (Carbon Fiber Reinforced Plastic).

* * * * *